(12) United States Patent
Hui

(10) Patent No.: US 6,826,228 B1
(45) Date of Patent: Nov. 30, 2004

(54) CONDITIONAL MASKING FOR VIDEO ENCODER

(75) Inventor: Yau Wai Lucas Hui, Singapore (SG)

(73) Assignee: STMicroelectronics Asia Pacific (PTE) Ltd., Singapore (SG)

(*) Notice: Subject to any disclaimer, the term of this patent is extended or adjusted under 35 U.S.C. 154(b) by 0 days.

(21) Appl. No.: 09/700,071

(22) PCT Filed: May 12, 1998

(86) PCT No.: PCT/SG98/00034

§ 371 (c)(1),
(2), (4) Date: Jan. 26, 2001

(87) PCT Pub. No.: WO99/59344

PCT Pub. Date: Nov. 18, 1999

(51) Int. Cl.[7] .............................................. H04B 1/66
(52) U.S. Cl. .......................... 375/240.03; 375/240.02; 375/240.04; 375/240.05; 375/240.12; 375/240.2; 382/232; 382/236; 382/238; 382/239; 382/250
(58) Field of Search ...................... 375/240.03, 240.02, 375/240.05, 240.04, 240.12, 240.2, 240.23, 240.24, 240.15; 382/232, 236, 238, 239, 250, 251

(56) References Cited

U.S. PATENT DOCUMENTS

| 5,136,376 A | * | 8/1992 | Yagasaki et al. | ........ | 375/240.23 |
| 5,144,426 A | * | 9/1992 | Tanaka et al. | ......... | 375/240.13 |
| 5,686,963 A |   | 11/1997 | Uz et al. | ..................... | 348/404 |
| 5,751,358 A | * | 5/1998 | Suzuki et al. | .......... | 375/240.04 |
| 5,850,259 A | * | 12/1998 | Sugiyama | .............. | 375/240.04 |
| 6,272,177 B1 | * | 8/2001 | Murakami et al. | ..... | 375/240.03 |

FOREIGN PATENT DOCUMENTS

| EP | 0424060 A | 4/1991 |
| EP | 0705040 A | 4/1996 |
| EP | 0828393 A | 3/1998 |

OTHER PUBLICATIONS

Pickering et al., "A VBR rate control algorithm for MPEG–2 video coders with perceptually adaptive quantisation and traffic shaping," *Signal Processing Image Comuunication* 11: 1–19, 1997.

Cicalini G et al., "Dynamic psychovisual bit allocation for improved quality bit rate in MPEG–2 transmission over ATM links," *Electronics Letters* 32 (4): 370–371, Feb. 15, 1996.

* cited by examiner

Primary Examiner—Shawn S. An
(74) Attorney, Agent, or Firm—Lisa K. Jorgenson; Robert Iannucci; Seed IP Law Group PLLC

(57) ABSTRACT

This method and apparatus described herein imposes masking factors to the determined quantization step sizes of macroblocks of a video sequence such that encoding efficiency is increased. A conditional masking method can be used to take advantage of the fact that P-pictures are more important than B-pictures in terms of motion and scene updates as coding noise in such updates are likely propagated by P-pictures. The masking can be applied conditionally to motion/scene update regions of a picture such that coding noise is reduced and therefore bits are saved from less propagation of this noise. Before encoding each macroblock of a picture from an input video sequence, a video encoder with conditional masking determines if the macroblock type belongs to a significant motion or scene update region. A conditional masking factor is then determined for the macroblock based on the determined macroblock type and the picture coding type.

The conditional masking factor is combined with a macroblock reference quantization step-size which may be calculated using conventional methods based on bit allocation and bit utilization, and an optional activity masking factor based on activity level of the macroblock and/or its surrounding region to form the final quantization step-size for coding of the macroblock.

20 Claims, 1 Drawing Sheet

CONDITIONAL MASKING FOR VIDEO ENCODER

TECHNICAL FIELD

The present invention relates to a method and apparatus for encoding video sequences. In particular, the present invention relates to a method and apparatus for quantization step size determination for compression of video signals.

BACKGROUND ART

Methods for encoding moving pictures or video had been developed for efficient transmission and storage. A current art of such encoding methods is found in MPEG2 Test Model 5, ISO/IEC JTC1/SC29/WG11/NO400, April 1993, and the disclosure of that document is hereby expressly incorporated herein by reference. In this method, an input video sequence is organized into sequence layer, group-of-pictures, pictures, slices, macroblocks, and finally block layer. Each picture in a group-of-pictures will be coded according to its determined picture coding type.

The picture coding types used in the MPEG2 Test Model 5 include intra-coded picture (I-picture), predictive-coded picture (P-picture), and bi-directionally predictive-coded picture (B-picture). The I-pictures are used mainly for random access or scene update. The P-pictures use forward motion predictive coding with reference to previously coded I- or P-pictures (anchor pictures), and the B-pictures use both forward and backward motion predictive/interpolative coding with reference to previously coded I- or P-pictures. A group of pictures (GOP) is formed in encoded order starting with an I-picture and ending with the picture before the next I-picture in the sequence.

A picture is partitioned into smaller and non-overlapping blocks of pixel data called macroblocks (MB) before encoding. Each MB from a P- or B-picture is subjected to a motion estimation process in which forward motion vectors, and backward motion vectors for the case of a B-picture MB, are determined using reference pictures from a frame buffer. With the determined motion vectors, motion compensation is performed where in the intra- or inter-picture prediction mode of the MB is first determined according to the accuracy of the motion vectors found, followed by generating the necessary predicted MB.

The predicted MB is then subjected to discrete cosine transform (DCT) and quantization of the DCT coefficients based on quantization matrices and quantization step-size. The quantized DCT coefficients of the MB is then run-length encoded with variable length codes (VLC) and multiplexed with additional information such as selected motion vectors, MB coding modes, quantization step-size, and/or picture and sequence information, to form the output bitstream.

Local decoding is performed by inverse quantizing the quantized DCT coefficients, followed by inverse DCT, and motion compensation. Local decoding is performed such that the reference pictures used in the motion compensation are identical to those used by any external decoder.

The quantization step-size (QS) used for quantizing the DCT coefficients of each MB has direct impact on the number of bits produced at the output of run-length VLC encoding process, and therefore the average output bit rate. It has also a direct impact on the encoding quality, which represents the output picture quality at the corresponding decoder. In general, larger QS generates lower output bit rate and lower encoding quality. In order to control output bit rate and picture quality so that the resulting bitstream can satisfy channel bandwidth or storage limitation as well as quality requirements, rate control and quantization control algorithms are used.

Some methods for rate control and quantization control can be found in the above mentioned MPEG-2 Test Model 5. These methods comprise generally a bit allocation process, a rate control process, and an adaptive quantization process. In the bit allocation process, a target number of bits is assigned for a new picture to be coded according to a number of previously determined and pre-set parameters. The rate control step then calculates a reference quantization step-size for each MB based on the target bits for the picture and the number of bits already used from the target bits in encoding MBs from that picture. In the adaptive quantization process, the calculated reference quantization step-size is scaled according to local activities of the MB, and an average MB activity determined from the current or a previously coded picture. This scaling is done according to a level of masking effects of coding noise by human perception for MB with high or low activities within a picture. A video buffer verifier (VBV) may also be employed in such a way that underflow and overflow of the decoder input buffer are prevented as required by the MPEG standard to ensure a target bit rate is maintained.

Coding efficiency, which can be measured in terms of bit-rate saving or encoding picture quality improvement, is a key design issue for video encoder systems. An improvement in coding efficiency will have a large impact in communication or storage costs saving in a long run.

While various methods for enhancing coding efficiency may be developed, it is necessary to consider their impacts on implementation cost in particular when the systems are to be broadly used. Furthermore, it is desired that such methods for encoding should not introduce incompatibility problems inter-operating with decoders that are known to date (for example the MPEG video decoders).

SUMMARY OF THE INVENTION

It is therefore an object of the present invention to provide a method or apparatus for use in a video encoder to enhance its coding efficiency.

In accordance with the present invention, there is provided a video encoder for encoding sequences of images comprising intra-coding pictures and predictive-coding pictures into an encoded output bitstream, including:

an encoding processor for encoding each image of a sequence by partitioning, the image in to a plurality of macroblocks, performing necessary motion compensation and estimation and an orthogonal transform on each macroblock, and quantizing the transform coefficients according to a quantization step-size for incorporation in the output bitstream;

a conditional masking processor which is adapted to process macroblocks of predictive coding pictures to determine if each macroblock belongs to a significant motion or scene update region of the corresponding image based upon a comparison of a prediction activity of the macroblock and an average prediction activity for a previously coded picture, and determine a conditional masking factor based on the determination, the conditional masking processor including a prediction activity averaging processor for determining an average prediction activity for a previously encoded image; and a quantization step-size processor coupled to receive the conditional masking factor from the conditional masking processor and generate a quantization step-size value, based on a reference quantization step-size and the conditional masking factor, for use by the encoding processor in encoding each macroblock;

wherein the predictive-coding pictures of the pictures of the image sequence include mono-directional predictive coding pictures (P-pictures) and bi-directional predictive coding pictures (B-pictures), and wherein the prediction activity averaging processor determines an average prediction activity for each type of predictive coding picture and wherein for a macroblock from a P-picture, a value for the conditional masking factor is selected by said conditional masking processor from between first and second values according to a comparison between the macroblock prediction activity and the P-picture average prediction activity, and wherein for a macroblock from a B-picture, a value for the conditional masking factor is selected by said conditional masking processor from between third and fourth values according to a comparison between the macroblock prediction activity and the B-picture average prediction activity.

The present invention also provides a method for use in video encoding for encoding sequences of images comprising intra-coding pictures and predictive-coding pictures into an encoded output bitstream, including the steps of:

partitioning images into a plurality of macroblocks;

processing macroblocks of predictive-coding pictures to determine if each macroblock belongs to a significant motion or scene update region of the corresponding image, based upon a comparison of a prediction activity of the macroblock and an average prediction activity for a previously coded picture and determining a corresponding conditional masking factor;

generating a quantization step-size value based on a reference quantization step-size and the conditional masking factor; and encoding each image by performing necessary motion compensation and estimation and an orthogonal transform on each macroblock, and quantizing the transform coefficients according to the generated quantization step-size, for incorporation in the output bitstream wherein the predictive-coding pictures of the image sequence include mono-directional predictive coding pictures (P-pictures) and bi-directional predictive coding pictures (B-pictures), and wherein a record is maintained of the average prediction activity for each type of predictive coding picture and wherein for a macroblock from a P-picture, a value for the conditional masking factor is selected from between first and second values according to a comparison between the macroblock prediction activity and the P-picture average prediction activity, and wherein for a macroblock from a B-picture, a value for the conditional masking factor is selected from between third and fourth values according to a comparison between the macroblock prediction activity and the B-picture average prediction activity.

Embodiments of the present invention make use of a conditional masking method to take advantage of the fact that P-pictures are more important than B-pictures in terms of motion and scene updates as coding noise in such updates are likely propagated by P-pictures.

The masking can be applied conditionally to motion/scene update regions of a picture such that coding noise is reduced and therefore bits are saved from less propagation of this noise. The conditional masking method can also make use of the fact that these updates attract visual attention and should be coded with less distortions.

Before encoding each macroblock of a picture from an input video sequence, a video encoder with conditional masking according to an embodiment of the present invention determines if the macroblock type belongs to a significant motion or scene update region. A conditional masking factor is then determined for the macroblock based on the determined macroblock type and the picture coding type.

The conditional masking factor is combined with a macroblock reference quantization step-size which may be calculated using conventional methods based on bit allocation and bit utilization, and an optional activity masking factor based on activity level of the macroblock and/or its surrounding region to form the final quantization step-size for coding of the macroblock.

The video encoder may utilize motion estimation, motion compensation, discrete cosine transform coding, and run-length encoding with variable length codes as video compression techniques.

BRIEF DESCRIPTION OF THE DRAWINGS

The invention is described in greater detail hereinbelow, by way of example only, with reference to a preferred embodiment thereof and the accompanying drawings, wherein.

DETAILED DESCRIPTION OF THE PREFERRED EMBODIMENTS

Figure 1:
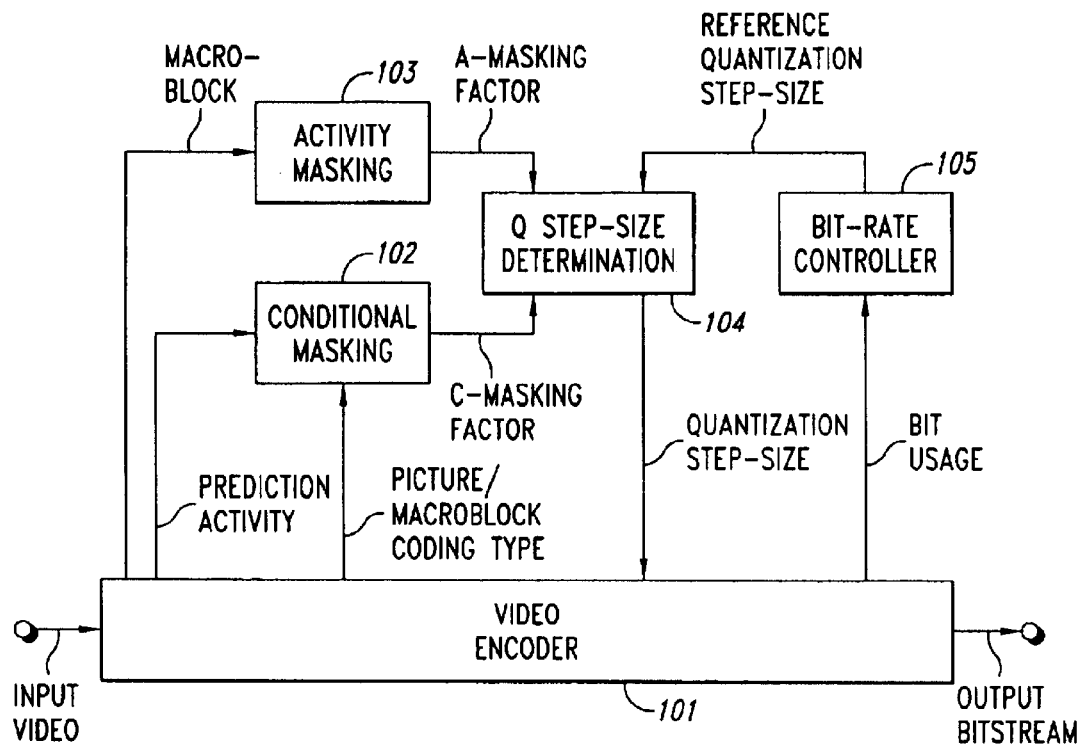
FIG. 1 is a block diagram illustrating a video encoder with conditional masking according to an embodiment of the present invention.

FIG. 1 illustrates an embodiment of a video encoder with conditional masking according to the present invention. An input video sequence is encoded by video encoder 101 to produce a compressed output bitstream which may be transmitted to an external decoder via a communication channel or recorded on digital storage media for playback applications. Typically, the video encoder 101 utilizes motion estimation, motion compensation, discrete cosine transform coding, and run-length encoding with variable length codes as video compression techniques. A video encoder may be implemented such that the output bitstream is compliant to one of the ISO/IEC MPEG standards, and can be decoded by the corresponding MPEG video decoders.

A rate controller 105 calculates a reference quantization step-size for each macroblock in a picture from the input video based on a predetermined target output bit-rate, and bit usage by the video encoder 101. The reference quantization step-size defines the level of quantization to be applied within the video encoder 101 such that the output number of bits generated for coding the macroblocks can be controlled. The controlling of bits in turn maintains the target output bit-rate and prevents overflow and/or underflow of a corresponding decoder input buffer.

An embodiment of the rate controller 105 may be found in the MPEG-2 Test Model 5. A target number of bits for coding a picture is first determined based on target output bit-rate, picture coding type, bit usage and average quantization step-sizes of past coded pictures. With the determined target number of bits, the reference quantization step-size is calculated for each macroblock of the picture. VBV checking and correction may also be applied in the rate controller.

In certain applications, the rate controller 105 may produce fixed reference quantization step-sizes. Such methods may be useful for constant quality or variable bit-rate encoding.

With each macroblock, an activity masking module 103 determines an A-masking factor. The A-masking factor is an activity scaling factor for the determined reference quantization step-size to enhance encoding quality based on human perception. It is determined by the local and/or surrounding activities of the macroblock and an average activity from the current or a previously coded picture. An example embodiment of activity masking is described in the MPEG-2 Test Model 5 Adaptive Quantization method.

Conditional masking 102 is also applied to each macroblock. In a particular embodiment, a C-masking factor is determined for each macroblock which is not intra-coded, and dependent on the picture coding type (P-picture or B-picture). The C-masking factor is determined such that higher masking is generated for macroblocks not belonging to a significant motion or scene update region. Furthermore, additional masking is given for such macroblocks belonging to a B-picture. Prediction activity in the form of macroblock prediction error variance may be used to determine if the macroblock belongs to a significant motion or scene update region. Such prediction error variance is usually obtained from the motion vector decision (motion compensation) process. It is given by:

$$P_{act} = \frac{1}{m} \sum_{i=1}^{m} [MB_{original}(i) - MB_{predicted}(i)]^{\alpha}$$

where $MB_{original}(i)$ is the $i^{th}$ pixel of the macroblock to be coded, $MB_{predicted}(i)$ is the $i^{th}$ pixel of a predicted macroblock, m is the total number of pixels in a macroblock, $P_{act}$ is the prediction activity, and α is a constant (e.g. 1 or 2).

A Q Step-Size Determination module 104 applies the determined A-masking factor and C-masking factor to the reference quantization step-size to produce the final quantization step-size. The quantization step-size is to be used by the video encoder 101 to quantize the macroblock. Motion compensation and discrete cosine transform may be performed for the macroblock before it is quantized. The quantized macroblock is run-length encoded with variable length codes, multiplexed together with all necessary side information to form the output bitstream. An equation for determining the quantization step-size is given by:

$$Q_s = Q_{ref} \times A_{masking} \times C_{masking}$$

where $Q_s$ is the quantisation step-size, $Q_{ref}$ is the reference quantisation step-size, $A_{masking}$ is the determined A-masking factor, and $C_{masking}$ is the determined C-masking factor.

Figure 2:
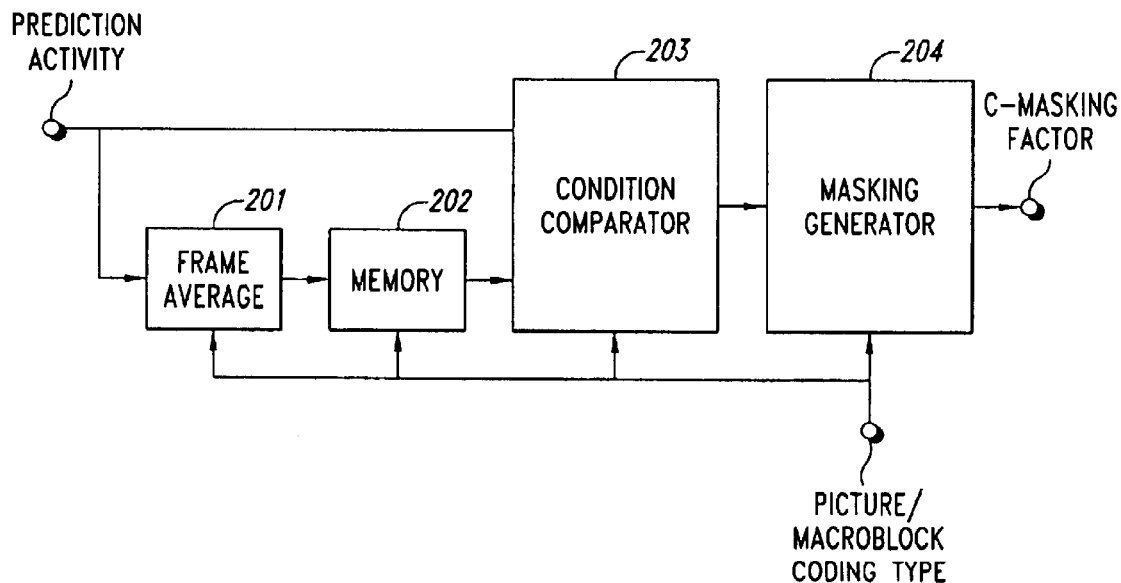
FIG. 2 is a block diagram illustrating a conditional masking factor calculation unit according to one embodiment of the invention.

An embodiment of the Conditional masking factor calculation unit is illustrated in block diagram form in FIG. 2. An average of the prediction activity is calculated by frame average 201 for a coded picture and the result is stored in memory 202. Two average prediction activities will be determined, one for a past coded P-picture and one for a past coded B-picture. The averaging process takes into account only macroblocks which are not intra-coded as indicated by the macroblock coding type.

A condition comparator 203 is used to compare the prediction activity of the current macroblock and the average prediction activity of a past coded picture of the same picture coding type to decide whether or not the macroblock type belongs to a significant motion or scene update region. It is not necessary to compare intra-coded macroblocks (e.g. macroblocks from I-pictures) as they are naturally considered as scene update regions.

With the decided macroblock type, a masking generator 204 determines the conditional masking (C-masking) factor. As mentioned earlier, the C-masking factor is determined such that higher masking is generated for macroblocks not belonging to a significant motion or scene update region; and furthermore, additional masking is given for such macroblocks belonging to a B-picture.

A simplified implementation of the condition comparator 203 and masking generator 204 is represented by the following pseudo code:

```
If (picture_coding_type == P-picture) {
    If (P_act < P_average) C-Masking = K_1;
    else C-Masking = K_2;
}
If (picture_coding_type == B-picture) {
    If (P_act < B_average) C-Masking = K_3;
    else C-Masking = K_4;
}
``` where $P_{act}$ is the prediction activity of the current macroblock, $P_{average}$ is the average $P_{act}$ of a previously coded P-picture, $B_{average}$ is the average $P_{act}$ of a previously coded B-picture, and $K_1$, $K_2$, $K_3$ and $K_4$ are constants (e.g $K_1 > K_2$, $K_3 > K_4$)

Conditional masking is incorporated into a video encoder such that when encoding a video sequence using constant bit-rate the overall encoding quality will be improved. In variable bit-rate operation where constant encoding quality is maintained, a video encoder with conditional masking according to the present invention will reduce the actual bit-rate required for encoding. In particular, a lesser number of bits will be required for encoding B-pictures in a sequence with the present invention.

As will be apparent to those of ordinary skill in the art of video encoding, the present invention and video encoders incorporating the present invention can be implemented in any of a variety of ways such as embodied in a computer program operating on general purpose computing apparatus or in a custom designed integrated circuit for incorporation into other electronic apparatus, for example. The actual implementation of the methods of the present invention described hereinabove into known forms of video encoders is considered a matter of routine to those skilled in the art, and is not described further herein so as to avoid obscuring the principles of the invention.

The foregoing detailed description of the present invention has been presented by way of example only, and is not intended to be considered limiting to the invention which is defined in the claims appended hereto.

Throughout this specification and the claims which follow, unless the context requires otherwise, the word "comprise", and variations such as "comprises" and "comprising", will be understood to imply the inclusion of a stated integer or step or group of integers or steps but not the exclusion of any other integer or step or group of integers or steps.

What is claimed is:

1. A video encoder for encoding sequences of images that include intra-coding pictures and predictive-coding pictures into an encoded output bitstream, comprising:

an encoding processor for encoding each image of a sequence by partitioning the image into a plurality of macroblocks, performing necessary motion compensation and estimation and an orthogonal transform on each macroblock, and quantizing the transform coefficients according to a quantization step-size for incorporation in the output bitstream;

a conditional masking processor structured to process macroblocks of predictive coding pictures to determine if each macroblock belongs to a significant motion or scene update region of the corresponding image based upon a comparison of a prediction activity of the macroblock and an average prediction activity for a previously coded picture, and determine a conditional masking factor based on the determination, the conditional masking processor including a prediction activity averaging processor for determining an average prediction activity for a previously encoded image; and a quantization step-size processor coupled to receive the conditional masking factor from the conditional masking processor and generate a quantization step-size value, based on a reference quantization step-size and the conditional masking factor, for use by the encoding processor in encoding each macroblock;

wherein the predictive-coding picture of the pictures of the image sequence include mono-directional predictive coding picture (P-pictures) and bi-directional predictive code pictures (B-pictures), and wherein the prediction activity averaging processor determines an average prediction activity for each type of predictive coding picture and wherein for a macroblock from a P-picture, a value of the conditional masking factor is selected by said conditional masking processor from between first and second values according to a comparison between the macroblock prediction activity and the P-picture average prediction activity, and wherein for a macroblock from a B-picture, a value for the conditional masking factor is selected by said conditional masking processor from between third and fourth values according to a comparison between the macroblock prediction activity and the B-picture average prediction activity.

2. A video encoder as claimed in claim 1, wherein if a measured prediction activity value for a macroblock is less than the average prediction activity then the conditional masking factor is set to a first value, otherwise the conditional masking factor is set to a second value.

3. A video encoder as claimed in claim 1, wherein said first value is greater than said second value, and said first value is selected if the macroblock prediction activity is less than the P-picture average prediction activity.

4. A video encoder as claimed in claim 1, wherein said third value is greater than said fourth value, and said third value is selected if the macroblock prediction activity is less than the B-picture average prediction activity.

5. A video encoder as claimed in claim 1, wherein the prediction activity for a macroblock is determined according to:

$$P_{act} = \frac{1}{m}\sum_{i=1}^{m} [MB_{original}(i) - MB_{predicted}(i)]^{\alpha}$$

where $MB_{original}(i)$ is the $i^{th}$ pixel of the macroblock to be coded, $MB_{predicted}(i)$ is the $i^{th}$ pixel of a predicted macroblock, m is the total number of pixels per macroblock, $P_{act}$ is the prediction activity, and $\alpha$ is an integer constant.

6. A video encoder as claimed in claim 1, further including an activity masking processor coupled to the quantization step-size processor, for generating an activity masking factor based on human perceptional limitations, and wherein the quantization step-size value generated by said quantization step-size processor is also based on the activity masking factor.

7. A video encoder as claimed in claim 6, wherein the quantization step-size value generated by the quantization step-size processor is determined according to:

$$Q_s = Q_{ref} \times A_{masking} \times C_{masking}$$

where $Q_s$ is the quantization step-size, $Q_{ref}$ is the reference quantization step-size, $A_{masking}$ is the activity masking factor, and $C_{masking}$ is the conditional masking factor.

8. A method for use in a video encoder for encoding sequences of images including intra-coding picture and predictive-coding pictures into an encoded output bitstream, comprising the steps of:

partitioning images into a plurality of macroblocks;

processing each macroblock of predictive-coding pictures to determine if each macroblock belongs to a significant motion or a scene update region of the corresponding image based upon a comparison of a prediction activity of the macroblock and an average prediction activity for a previously coded picture, and determining a corresponding conditional masking factor;

generating a quantization step-size value based on a reference quantization step-size and the conditional masking factor; and encoding each image by performing necessary motion compensation and estimation and an orthogonal transform on each macroblock, and quantizing the transform coefficients according to the generated quantization step-size, for incorporation in the output bitstream wherein the predictive-coding pictures of the image sequence include mono-directional predictive coding pictures (P-pictures) and bi-directional predictive coding pictures (B-pictures), and where a record is maintained of the average prediction activity for each type of predictive coding picture and wherein for a macroblock from a P-picture, a value for the conditional masking factor is selected from between first and second values according to a comparison between the macroblock prediction activity and the P-picture average prediction activity, and wherein for a macroblock from a B-picture, a value for the conditional masking factor is selected from between third and fourth values according to a comparison between the macroblock prediction activity and the B-picture average prediction activity.

9. A method as claimed in claim 8, wherein if a measured prediction activity value for a macroblock is less than the average prediction activity then the conditional masking factor is set to a first value, otherwise the conditional masking factor is set to a second value.

10. A method as claimed in claim 8, wherein said first value is greater than said second value, and said first value is selected if the macroblock prediction activity is less than the P-picture average prediction activity.

11. A method as claimed in claim 8, wherein said third value is greater than said fourth value, and said third value is selected if the macroblock prediction activity is less than the B-picture average prediction activity.

12. A method as claimed in claim 8, wherein the prediction activity for a macroblock is determined according to:

$$P_{act} = \frac{1}{m}\sum_{i=1}^{m} [MB_{original}(i) - MB_{predicted}(i)]^{\alpha}$$

where $MB_{original}(i)$ is the $i^{th}$ pixel of the macroblock to be coded,
$MB_{predicted}(i)$ is the $i^{th}$ pixel of a predicted macroblock,
m is the total number of pixels per macroblock,
$P_{act}$ is the prediction activity, and
$\alpha$ is an integer constant.

13. A method as claimed in claim 8, further including a step of generating an activity masking factor based on human perceptional limitations, wherein the generated quantization step-size value is also based on the activity masking factor.

14. A method as claimed in claim 13, wherein the quantization step-size value is generated according to:

$$Q_s = Q_{ref} \times A_{masking} \times C_{masking}$$

where $Q_s$ is the quantization step-size,
$Q_{ref}$ is the reference quantization step-size,
$A_{masking}$ is the activity masking factor, and
$C_{masking}$ is the conditional masking factor.

15. A video encoder for encoding sequences of images having mono-directional predictive coded pictures (pictures of a first type) and bi-directional predictive coded pictures (pictures of a second type) comprising:

an encoding processor having an output providing a plurality of macroblocks and an input;
a conditional masking processor structured to process macroblocks of predictive coding pictures to determine if each macroblock belongs to a significant motion or scene update region of the corresponding image based upon a comparison of a prediction activity of the macroblock and an average prediction activity for a previously coded picture, the conditional masking processor having an output providing first and second conditional masking factors, and an input;
a quantization step-size processor having an input receiving the conditional masking factors and an output providing a quantization step-size value to the input of the encoding processor; and
a prediction activity averaging processor having an input receiving a previously encoded picture and an output coupled to the input of the conditional masking processor and providing a first average prediction activity of each macroblock, a second average prediction activity of the mono-directional predictive coded pictures, and a third average prediction activity of the bi-directional predictive coded pictures wherein the conditional masking processor compares the second average prediction activity of the mono-directional predictive coded pictures to the first average prediction activity of each macroblock to determine the first conditional masking value and compares the third average prediction activity of the bi-directional predictive coded pictures to determine the second conditional masking factor.

16. The video encoder of claim 15, wherein if the first average prediction activity value for a macroblock is less than the second average prediction activity then the first conditional masking factor is set to a first value, otherwise the first conditional masking factor is set to a second value.

17. The video encoder of claim 15, wherein if the first average prediction activity value for a macroblock is less than the third average prediction activity then the second conditional masking factor is set to a third value, otherwise the second conditional masking factor is set to a fourth value.

18. The video encoder of claim 15, wherein the first average prediction activity for a macroblock is determined according to:

$$P_{act} = \frac{1}{m}\sum_{i=1}^{m} [MB_{original}(i) - MB_{predicted}(i)]^{\alpha}$$

where $MB_{original}(i)$ is the $i^{th}$ pixel of the macroblock to be coded,
$MB_{predicted}(i)$ is the $i^{th}$ pixel of a predicted macroblock,
m is the total number of pixels per macroblock,
$P_{act}$ is the prediction activity, and
$\alpha$ is an integer constant.

19. The video encoder of claim 15, further including an activity masking processor coupled to the quantization step-size processor, for generating an activity masking factor based on human perceptional limitations, and wherein the quantization step-size value generated by said quantization step-size processor is also based on the activity masking factor.

20. The video encoder of claim 19 wherein the quantization step-size value generated by the quantization step-size processor is determined according to:

$$Q_s = Q_{ref} \times A_{masking} \times C_{masking}$$

where $Q_s$ is the quantization step-size,
$Q_{ref}$ is the reference quantization step-size,
$A_{masking}$ is the activity masking factor, and
$C_{masking}$ is one of the conditional masking factors.

* * * * *